United States Patent [19]

Hall

[11] Patent Number: 4,861,478
[45] Date of Patent: Aug. 29, 1989

[54] REMOVABLE FUEL TANK FILTER

[76] Inventor: Morris D. Hall, 2509 Geraldine, Midland, Tex. 79707

[21] Appl. No.: 176,047

[22] Filed: Mar. 30, 1988

Related U.S. Application Data

[63] Continuation-in-part of Ser. No. 146,266, Jan. 20, 1988, abandoned.

[51] Int. Cl.$^4$ .............................................. B01D 27/08
[52] U.S. Cl. .................... 210/416.4; 210/448; 210/460; 141/286; 220/86
[58] Field of Search ............ 141/286; 210/496.4, 210/460, 463, 448; 220/86 R; 55/493, 505

[56] References Cited

U.S. PATENT DOCUMENTS

| | | | |
|---|---|---|---|
| 3,016,161 | 1/1962 | Peplin | 220/86 R |
| 3,722,186 | 3/1973 | Parker et al. | 55/505 X |
| 3,734,292 | 5/1973 | Bell | 210/172 |
| 3,900,397 | 7/1975 | Bell | 210/128 |
| 3,947,362 | 3/1976 | Efani | 210/416.4 |
| 4,350,509 | 9/1982 | Alseth et al. | 55/505 X |
| 4,420,396 | 12/1983 | Yamamoto | 210/416.4 |
| 4,450,880 | 5/1984 | Scheurenbrand | 220/86 R |
| 4,513,797 | 4/1985 | Tompkins | 141/286 X |
| 4,617,121 | 10/1986 | Yokoyama | 210/416.4 |
| 4,626,347 | 12/1986 | Neglio | 210/416.4 X |
| 4,630,749 | 12/1986 | Armstrong et al. | 220/86 R |
| 4,640,771 | 2/1987 | Whalen et al. | 210/167 |

FOREIGN PATENT DOCUMENTS

| | | | |
|---|---|---|---|
| 0685923 | 5/1964 | Canada | 210/416.4 |
| 0014034 | 5/1976 | France | 220/86 R |

Primary Examiner—Charles Hart
Attorney, Agent, or Firm—Arnold, White & Durkee

[57] ABSTRACT

A removable fuel tank filter device, comprising a hollow body tube with an opening at either end, mesh filtering means located at one end of the tube, and at the other end of the tube means for maintaining the device in close proximity to the opening of a fuel tank, can be used to remove sediment from liquid hydrocarbon fuels being added to a fuel tank. The filter is placed in the opening to the fuel tank, a fuel nozzle is placed into the filter, and as fuel is pumped into the tank, the filter acts to remove any sediment that is present.

1 Claim, 4 Drawing Sheets

U.S. Patent     Aug. 29, 1989     Sheet 1 of 4     4,861,478
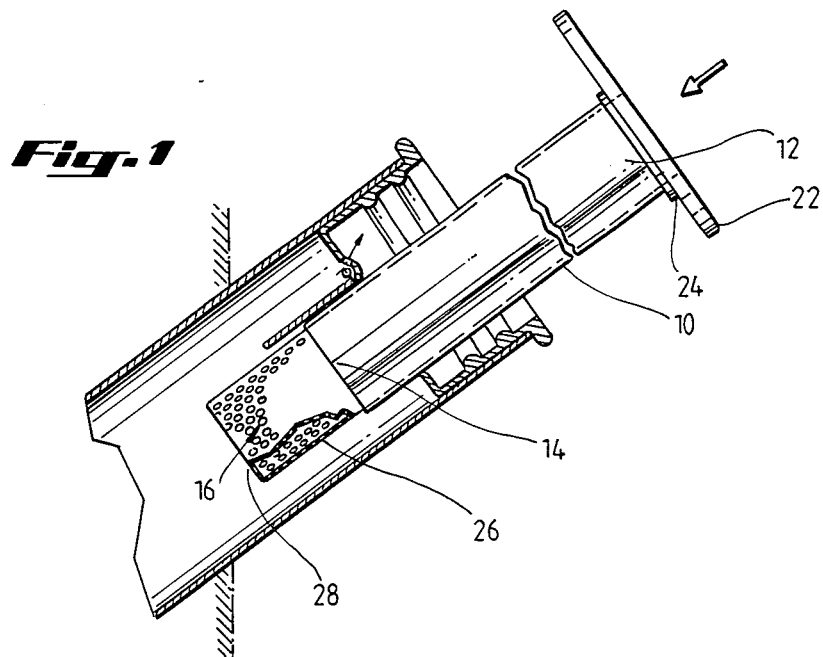
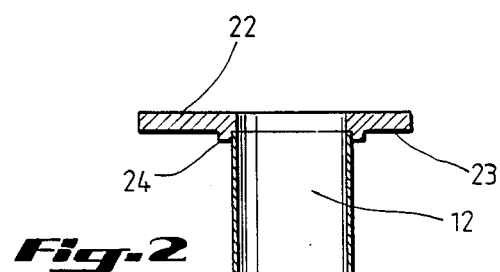
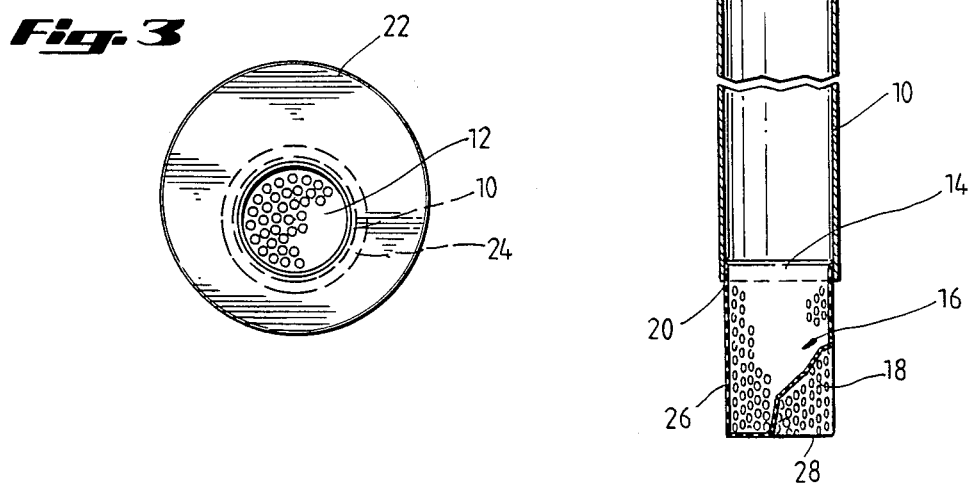

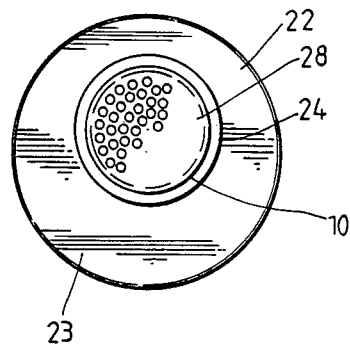
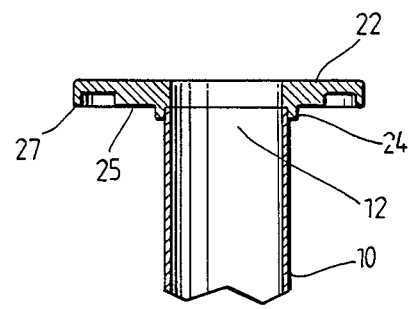
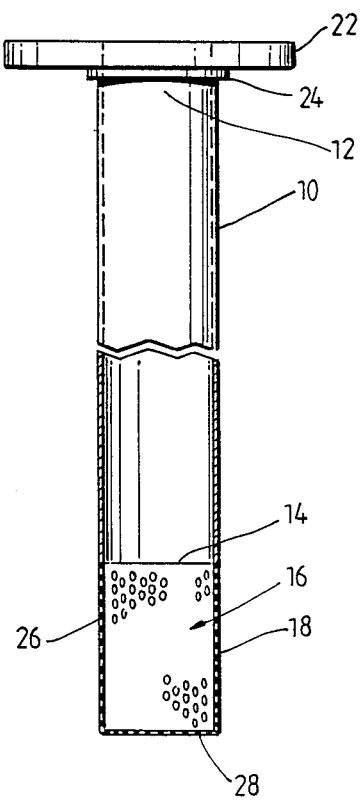
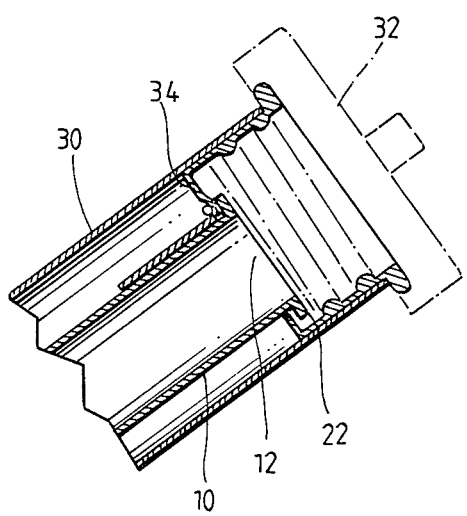

REMOVABLE FUEL TANK FILTER

BACKGROUND OF THE INVENTION

This patent application is a continuation-in-part of U.S. Ser. No. 146,266, filed on Jan. 20, 1988 and now abandoned.

The present invention relates to filters for preventing sediment or similar foreign materials from entering a fuel tank along with liquid hydrocarbon fuel.

Liquid hydrocarbon fuels such as gasoline or diesel fuel sometimes become contaminated with water or a particulate material such as sediment between the time they are produced in a refinery and the time they enter the fuel tank from which they will ultimately be consumed. If the sediment reaches an internal combustion engine, it can cause the engine to perform poorly. Removal of the sediment requires the entire fuel tank to be removed and cleaned, a costly and time consuming process.

Efforts to use filters to combat this problem have been made in the past, but they have often relied on filters located near the bottom of the fuel tank, usually on the inlet of the line that carries fuel from the tank to the engine. This approach has major disadvantages. One disadvantage is that replacing the filter often requires removal of the fuel tank.

A long standing need exists for a way to prevent sediment from entering fuel tanks along with liquid hydrocarbon fuels.

SUMMARY OF THE INVENTION

A fuel tank filter device in accordance with the present invention includes a hollow body tube which has an opening on both ends, and which also has a diamter small enough to allow it to be inserted into an opening in a fuel tank. The device also includes filtering means which are adapted to allow liquid hydrocarbon fuel to pass through and to prevent sediment from passing through. The filtering means are attached to one opening of the body tube in a liquid tight fashion. The device also includes means for holding the body tube and filtering means in close proximity to the opening of the fuel tank, with these means being attached to the other opening of the body tube.

The filtering means can be made of mesh, such as a stainless steel mesh having a plurality of apertures in it. The body tube can have a circular or elliptical cross section. The length of the body tube should be sufficient to permit a fuel nozzle to be inserted into it, but does not necessarily have to be long enough to permit the fuel nozzle to be inserted completely into it.

A specific embodiment of the present invention comprises a hollow cylindrical body tube as described before, along with mesh filtering means which are adapted to allow liquid hydrocarbon fuel to pass through and to prevent sediment from passing through. The mesh filtering means have a tube shaped portion with openings at both ends a circular bottom portion, with one opening of the tube shaped portion being in substantially liquid-tight contact with one opening of the body tube, and the circular bottom portion being attached to the other opening of the tube shaped portion. The tube shaped portion of the mesh will preferably have a circular or elliptical cross section. This embodiment of the present invention also includes an outer rim which is attached to the other opening of the body tube, and has a large enough diameter to prevent the outer rim from passing through the opening in the fuel tank.

In another embodiment of the present invention, the hollow body tube and filtering means are one and the same.

A fuel tank filter device in accordance with the present invention can easily be removed and reinserted in the filling opening of a fuel tank. Some embodiments of the invention can also be inserted onto a fuel-dispensing nozzle and removed therefrom. The easy removability of the present invention provides the user with greater flexibility in using and replacing it.

BRIEF DESCRIPTION OF THE DRAWINGS

FIG. 1 shows a side cross sectional view of a device in accordance with the present invention being inserted into a fuel tank.

FIG. 2 shows a side cross sectional view of a device in accordance with the present invention.

FIG. 3 shows an end view of a device in accordance with the present invention, from the end through which fuel will be added.

FIG. 4 shows another end view of a device in accordance with the present invention, from the end opposite that shown in FIG. 3.

FIG. 5 shows a side cross sectional view of an alternate embodiment of a device in accordance with the present invention.

FIG. 6 is a side external view of a device in accordance with the present invention.

FIG. 7 is a side cross-sectional view of a device in accordance with the present invention in place in a fuel tank opening, with the cap for the tank shown by dotted lines.

DETAILED DESCRIPTION OF A SPECIFIC EMBODIMENT

Figure 8:
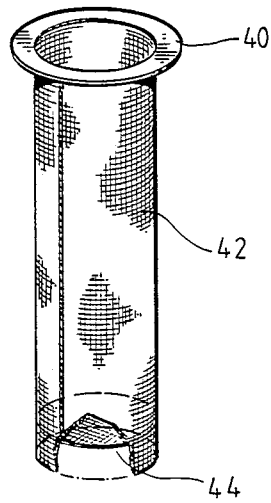
FIG. 8 is a perspective view of a device in accordance with the present invention whose body is comprised of mesh.

The present invention relates to a fuel tank filter device which can be inserted in the inlet to a fuel tank. For example, the embodiment shown in FIGS. 1–4 can be placed in the inlet to the fuel tank of an automobile, truck, boat, airplane, tractor, or other apparatus which consumes liquid hydrocarbon fuel.

In FIG. 2, the device includes a hollow body tube 10 with openings 12 and 14 at either end. At one end 14 of the tube 10 are filtering means 16, such as a stainless steel mesh containing a plurality of holes 18. The mesh 16 is attached to a base rim 20, which in turn may be attached to the inside surface of the tube 10.

At the other end 12 of the body tube 10, the filter has an outer rim 22 and inner rim 24. The inner rim 24 is optional. If it is included, the inner rim 24 can be attached around the outer surface of the end 12 of the body tube 10. The outer rim 22 can then be attached to the outer surface of the inner rim 24.

The outer rim 22 can have a flat lower surface 23, allowing it to rest on the rim around the opening in a fuel tank. Alternatively, as shown in FIG. 5, the outer rim 22 could have a flat circular plate 25 adapted to rest on top of a rim of the opening in the fuel tank, and an outer lip 27 which is at approximately a 90° angle to the flat circular plate, the outer lip being adapted to fit around the outside of the opening in the fuel tank.

At the other end 14 of the body tube 10 is the mesh 16. The mesh 16 preferably has a tube shaped portion 26 and a circular bottom portion 28. The mesh 16 can suitably be 30×30 10 gauge stainless steel.

Suitable dimensions for a filter in accordance with the present invention as shown in FIGS. 1-6 intended to be used in the fuel tank of an automobile that takes unleaded gas, are as follows:

| Part | Dimension (inches) |
| --- | --- |
| Body tube length | 5.0 |
| Mesh (tube shaped portion) length | 1.5 |
| Inner rim vertical thickness | 0.035 |
| Outer rim vertical thickness | 0.040 |
| Base rim vertical thickness | 0.07 |
| Overall length | 6.575 |
| Body tube inner diameter | 0.78 |
| Body tube outer diameter | 0.85 |
| Mesh outer diameter | 0.625 |
| Base rim inner diameter | 0.675 |
| Outer rim outer diameter | 1.11 |
| Inner rim outer diameter | 0.93 |

A device in accordance with the present invention can suitably be manufactured from materials that are known to those skilled in this field. The body tube can be made of plastic, metal, wood, or paper, while the mesh can be made of metal, paper, or plastic. The presently preferred materials are nylon for the tube and stainless steel for the mesh.

The device is used by placing it in the opening of a fuel tank, as shown in FIG. 1, inserting a fuel nozzle into the device, and then pumping fuel through the nozzle into the tank. Any sediment in the fuel will be filtered out by the mesh, thereby preventing the tank from becoming contaminated. The device can later be removed from the tank opening in order to clean out the retained sediment.

FIG. 7 shows the device in place in a fuel tank nozzle 30, with a cap 32 used to seal the tank. The outer rim 22 rests above on the rim 34 in the nozzle 30.

Another embodiment of the present invention is shown in FIG. 8. In this embodiment, the hollow body tube and filtering means are one and the same. In this embodiment, the device includes an outer rim 40, a mesh tube 42 which contains a plurality of holes, and a bottom mesh segment 44. The outer rim 40, mesh tube 42, and bottom mesh segment 44 preferably have a circular cross-section. The bottom mesh segment 44 is slightly smaller in diameter than the mesh tube 42, so it can be inserted into the lower opening of the tube 42 and welded into place there. The tube 42 can be formed by rolling a flat piece of mesh into a tube and then welding a vertical seam. The rim 40 can be fastened to the tube 42 by welding, soldering, or some similar means.

In the embodiment of FIG. 8, the mesh tube 42 is preferably made from 30×30 12 gauge or 40×40 10 gauge stainless steel, while the bottom mesh segment 44 is preferably made from 40×40 10 gauge stainless steel. The device preferably has the following dimensions.

| Part | Dimension (inches) |
| --- | --- |
| Outer rim outer diameter | 1.10 |
| Outer rim inner diameter | 0.88 variable to .875 |
| Outer rim vertical thickness | 0.035 |
| Mesh tube length | 3.00 |
| Mesh tube outer diameter | 0.88 variable to .875 |
| Mesh tube inner diameter | 0.832 variable to .835 |
| Bottom mesh segment outer diameter | 0.83 |
| Vertical overlap between mesh tube and bottom mesh segment | 0.30 |

Dimensions such as these adapt the device for easy insertion in and removal from the filling opening in the fuel tank of an automobile that burns unleaded gasoline. Such fuel tanks have a standard size inlet.

Figure 9:
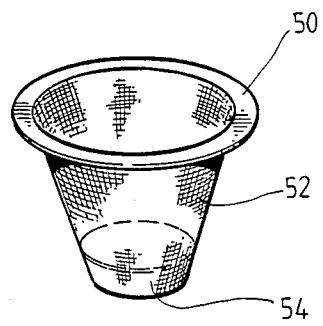
FIG. 9 is a perspective view of a device in accordance with the present invention which is adapted to be used with small engine-driven devices such as lawn mowers, tillers or snow blowers.

The embodiment of FIG. 8 can be modified as shown in FIG. 9 to make it suitable for use in small engine-driven apparatus, such as a lawn mowers, tillers and snow blowers. The mesh tube 52 in the embodiment is tapered rather than being cylindrical. As an example of suitable dimensions, the outer rim 50 can have an outer diameter of 1.410 inches and an inner diameter of 1.195 inches, with the vertical length of the mesh tube 52 being about 0.5 to 1.0 inches. As before, the bottom mesh segment 54 fits into the bottom of the mesh tube 52. Another embodiment has only the rim 50 and a bowl-shaped mesh tube 52.

Figure 10:
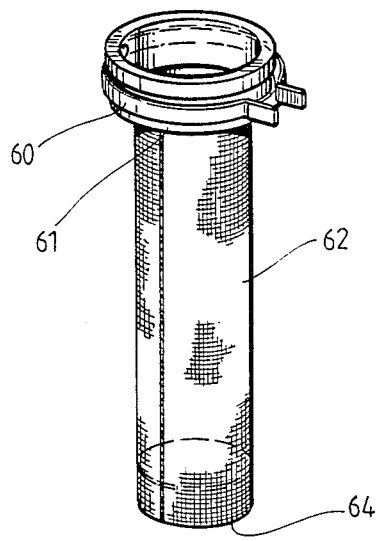
FIGS. 10 and 11 are a side view and top view, respectively, of a modified device in accordance with the present invention, adapted for use in fuel tanks which have a variable width tank opening.
Figure 11:
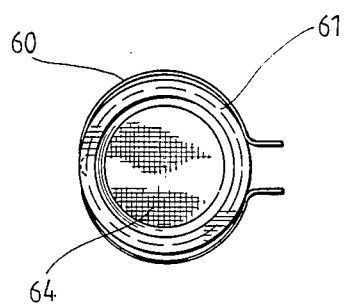

The embodiment shown in FIGS. 10 and 11 is adapted for use in the openings of fuel tanks for leaded gasoline or diesel fuel or any variable width tank opening. Unlike the openings in unleaded fuel tanks in automobiles, such tanks do not typically have standard-sized openings. In this embodiment, the mesh tube 62 and bottom mesh segment 64 are basically the same as in FIG. 8. However, the outer rim 60 is an expandable spring clamp which will expand to fit larger openings to fuel tanks. The lower portion 61 of the rim 60 is fastened to the mesh tube 62. The remainder of the rim 60 can be compressed by hand to have a reduced diameter. When released, the rim 60, which is preferably spring-loaded, will expand until it meets some obstruction, enabling to fit against the opening of fuel tanks having inlet openings of various sizes.

Figure 12:
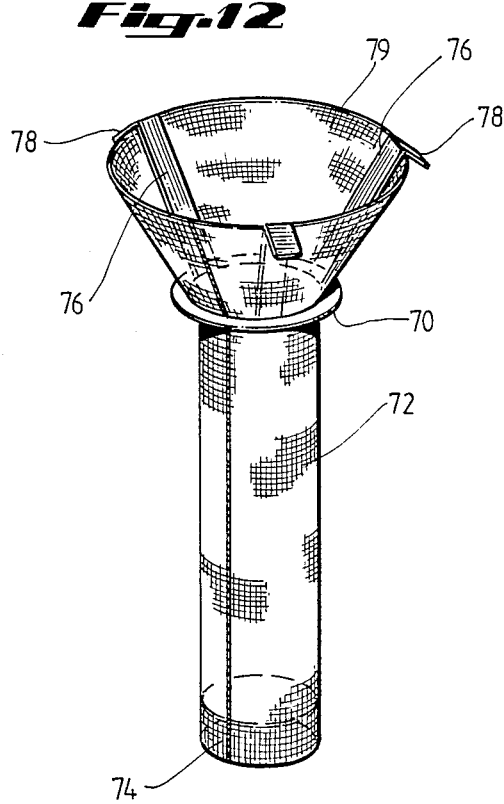
FIG. 12 is a side view of another modified device in accordance with the present invention, adapted for use in fuel tanks with wide inlets.

The embodiment shown in FIG. 12 is useful in the openings of fuel tanks such as those in farm equipment, since such fuel tanks typically have much larger openings for filling than do automobiel fuel tanks. The mesh tube 72 and bottom mesh segment 74 are as described before. The upper rim 70 has a plurality of extensions 76 attached to it, which are preferably made from flexible metal straps. At the end of each extension 76 are grasping means 78, which hook over the outer lip (not shown) of a fuel tank's filling opening. The embodiment of FIG. 12 can be used in openings of various sizes. A screen 79 may extend between the flexible straps 76.

Figure 13:
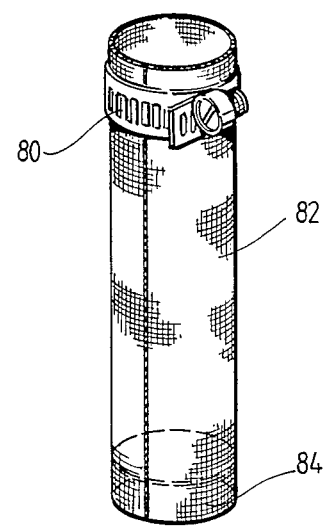
FIGS. 13 and 14 are side perspective and top views, respectively, of another modified device in accordance with the present invention, adapted for use on a fuel-dispensing nozzle.
Figure 14:
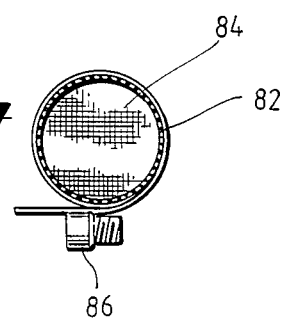

Another embodiment is shown in FIGS. 13 and 14. This embodiment is intended to be fastened around a fuel-dispensing nozzle, rather than being placed in the mouth of a fuel tank. This embodiment includes a mesh tube 82, a bottom mesh segment 84, and a tightenable clamping device 80. The clamping device 80 can be a stainless steel band which is tightened or loosened by turning a screw 86. The clamping device is securely tightened around the fuel dispensing nozzle when the nozzle is inserted into it.

Alternate embodiments are possible. For example, the filter device could be permanently built into place in or near the opening of the fuel tank. As another option, the body tube and outer rim could be permanently positioned in the tank, with the mesh being removable. In this embodiment, the mesh would slide in and out through the body tube.

Although the device preferably has a circular or elliptical cross section, it could also take other configurations, such as a triangular or square cross-section.

The description of specific embodiments given in this specification is intended to illustrate the present invention, not to provide an exhaustive description of all possible embodiments of the present invention. Those skilled in this field would recognize that modifications could be made which would remain within the scope of this invention.

I claim:

1. A removable fuel tank filter device, comprising:
a hollow body tube having a cylindrical wall and upper and lower ends, the diameter of the hollow body tube being small enough to allow it to be inserted into the fuel filling inlet of a fuel tank, with the upper end of the tube being open and with the cylindrical wall and lower end consisting across their entire surface area of a filtering mesh, the mesh being unblocked by any portion of the device, and further being adapted to allow liquid hydrocarbon fuel to pass through and to prevent sediment from passing through;
an outer, horizontally-extending rim which is attached to the upper end of the hollow body tube in a liquid tight fashion, the outer rim not substantially obstructing the flow of liquid hydrocarbon fuel into the hollow body tube, with the outer rim extending sufficiently far in the horizontal direction to prevent the outer rim from being able to enter into the fuel filling inlet of the fuel tank;
whereby the fuel tank filter device can be placed in the fuel filling inlet of a fuel tank, where it will be held in place at the inlet by the outer rim, and the fuel tank filter device can be removed at will.

* * * * *